United States Patent [19]
Chisholm et al.

[11] Patent Number: 5,674,928
[45] Date of Patent: Oct. 7, 1997

[54] THERMOPLASTIC RESIN COMPOSITIONS CONTAINING A HIGH HYDROXYL POLYESTER AND A POLYCARBONATE, AND ARTICLES MADE THEREFROM

[75] Inventors: Bret Chisholm, Mt. Vernon, Ind.; Richard Lucas, Bergen op Zoom; Franciscus J. M. Van Beek, NE Zundert, both of Netherlands

[73] Assignee: General Electric Company, Pittsfield, Mass.

[21] Appl. No.: 531,493

[22] Filed: Sep. 21, 1995

[51] Int. Cl.$^6$ ............ C08K 3/32; C08K 5/52; C08L 69/00; C08L 67/02
[52] U.S. Cl. ............ 524/147; 524/413; 524/414; 524/417; 525/67; 525/439
[58] Field of Search ............ 525/439, 67; 524/413, 524/414, 417, 147

[56] References Cited

U.S. PATENT DOCUMENTS

| | | | |
|---|---|---|---|
| 4,532,290 | 7/1985 | Jaquiss et al. | 524/417 |
| 4,749,755 | 6/1988 | Buysch et al. | 525/439 |
| 5,087,665 | 2/1992 | Chung et al. | 525/133 |
| 5,346,767 | 9/1994 | Tilley et al. | 525/412 |
| 5,441,997 | 8/1995 | Walsh et al. | 524/147 |

FOREIGN PATENT DOCUMENTS

| | | |
|---|---|---|
| 0 362 872 B1 | 12/1993 | European Pat. Off. . |
| 639601 | 2/1995 | European Pat. Off. . |

OTHER PUBLICATIONS

The Transesterification of Bisphenol–A Polycarbonate (PC) and Polybutylene Terephthalate (PBTP): A New Route to Block Copolycondensates, Polymer Engineering and Science, Mar. 1982, Vo. 22, No. 4, J. Devaux, P. Godard and J.P. Mercier, pp. 229–233.

Primary Examiner—David Buttner

[57] ABSTRACT

A thermoplastic resin composition is provided containing (a) a polyester resin having a hydroxyl level of at least 45 meq/kg, (b) a polycarbonate resin, (c) a quencher and preferably (d) a graft copolymer containing a rubbery substrate and a rigid superstrate. The thermoplastic resin composition exhibits enhanced resistance to property degradation during molding and exhibits enhanced paint adhesion properties. The composition is useful for making painted articles such as automotive bumpers.

14 Claims, No Drawings

THERMOPLASTIC RESIN COMPOSITIONS CONTAINING A HIGH HYDROXYL POLYESTER AND A POLYCARBONATE, AND ARTICLES MADE THEREFROM

DESCRIPTION OF THE INVENTION

1. Field of the Invention

The present invention relates to polyester/polycarbonate blend compositions and articles made therefrom, and more particularly relates to impact modified polyester/polycarbonate blend compositions and articles made therefrom.

2. Description of the Related Art

Poly(butylene terephthalate) (PBT) is a semicrystalline engineering thermoplastic that possesses good solvent resistance but generally exhibits less than optimum impact strength. In contrast, bisphenol-A polycarbonate (PC) is an amorphous engineering thermoplastic that possesses good impact strength but generally less than optimum solvent resistance. By blending PBT and PC, a polymer alloy is produced possessing both good impact strength and good solvent resistance.

Due to this desirable combination of properties, PC/PBT blends are useful in the automotive industry where resistance to gasoline and motor oil are important as is the ability to resist fracture upon impact. For applications such as bumpers where even higher impact is required than can be obtained by simply blending PBT and PC, an impact modifier (IM) such as methylmethacrylate-butadiene-styrene copolymer (MBS) or acrylonitrile-butadiene-styrene copolymer (ABS) is added to PBT/PC blends.

A current trend in the automotive market is reduction in bumper thickness. Thickness reduction provides the automobile manufacturer with lower raw material costs and a reduction in vehicle weight. The latter aspect is becoming increasingly more important due to governmental demands for lower emissions and consumer demands for better fuel economy.

From a materials aspect, thinner bumpers require materials with even higher impact strength than currently needed as well as higher flow for filling thinner wall molds. The most obvious means of increasing the impact strength are increasing the level of IM, increasing the level of PC, increasing the molecular weight of PBT, increasing the molecular weight of PC, or any combination of the above. In addition to increasing impact strength, each of these material modifications also decreases the flow of the material making it more difficult to fill thinner wall molds.

Additionally, PBT/PC bumpers are typically painted and it is important that the paint exhibit adequate adhesive properties on the molded bumper part. Netherland's patent application 8902313 sets out improvement of bonding of lacquer to mixture of polybutylene terephthalate and polycarbonate with polyalkylene glycols such as polyethylene glycols, but such additions can result in a lowering of the Vicat temperature of the composition which is disadvantageous notably in the lacquer process. Additionally, it has been disclosed to use high hydroxyl containing high molecular weight PBT for paint adhesion (see European Patent Application 0639601A2), but the need for thinner bumpers makes these compositions containing relatively high molecular weight polyesters somewhat less than optimum.

Consequently, there is a need for polyester/polycarbonate blend compositions exhibiting enhanced melt flow rates and resistance to degradation of impact properties upon molding.

SUMMARY OF THE INVENTION

A thermoplastic resin composition is provided comprising (a) a polyester resin having a hydroxyl level of greater than 45 meq/kg, (b) an aromatic polycarbonate resin and (c) a melt stabilizer (also referred to herein as a quencher). The composition preferably contains an impact modifying amount of a graft copolymer. The compositions exhibit improved impact property retention for given melt flow rates, and are particularly useful for making thin walled articles.

DETAILED DESCRIPTION OF THE INVENTION

The thermoplastic resin composition comprises (a) polyester resin having a high level of hydroxy units, (b) an aromatic polycarbonate resin, and preferably an impact modifying graft copolymer. The composition exhibits enhanced impact retention under molding conditions for making thin walled molded articles.

The polyester resin, preferably a polyalkylene phthalate resin, more preferably a polyalkylene terephthalate resin, and most preferably a polybutylene terephthalate resin, is preferably present at a level of from 20 to 70 percent by weight based on the total weight of the composition, more preferably from 30 to 60 percent by weight thereof, and most preferably from 35 to 55 percent by weight thereof. The aromatic polycarbonate resin is preferably present at a level of from 20 to 65 percent by weight based on the total weight of the composition, more preferably from 30 to 60 percent by weight thereof, and most preferably from 35 to 55 percent by weight thereof, and the quencher is preferably present at a level of from 0.01 to 10 percent by weight based on the total weight of the composition more preferably from 0.05 to 2 percent by weight thereof. The rubbery graft copolymer (impact modifier) is preferably present at a level of from 5 to 20 percent by weight based on the total weight of the composition, more preferably from 10 to 15 percent by weight thereof.

Polyesters suitable for use in the present compositions include those comprising structural units of the formula:

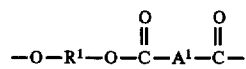

wherein each $R^1$ is independently a divalent aliphatic, alicyclic or aromatic hydrocarbon or polyoxyalkylene radical, or mixtures thereof and each $A^1$ is independently a divalent aromatic radical, or mixtures thereof. Examples of suitable polyesters are poly(alkylene dicarboxylates), liquid crystalline polyesters, and polyester copolymers such as polyesteramides. It is also possible to use a branched polyester in which a branching agent, for example, a glycol having three or more hydroxyl groups or a trifunctional or multifunctional carboxylic acid has been incorporated.

The $R^1$ radical may be, for example, a $C_{2-10}$ alkylene radical, a $C_{6-10}$ alicyclic radical, a $C_{6-10}$ aromatic radical or a polyoxyalkylene radical in which the alkylene groups contain about 2–6 and most often 2 or 4 carbon atoms. The $A^1$ radical in the above formula is most often p- or m-phenylene or a mixture thereof. This class of polyesters includes the poly(alkylene terephthalates), and the poly (alkylene naphthalates). Polyesters are known in the art as illustrated by the following U.S. Patents, which are incorporated herein by reference. U.S. Pat. Nos. 2,465,319 2,720, 502 2,727,881 2,822,348 3,047,539 3,671,487 3,953,394 4,128,526

The poly(alkylene terephthalates), for example, poly (ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly (butylene-2,6-naphthalate) (commonly abbreviated "PBN") and poly(ethylene-2,6-naphthalate) (commonly abbreviated "PEN"). Various mixtures of polyesters are also sometimes very suitable.

Because of the tendency of polyesters to undergo hydrolyric degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder.

The polyesters generally have number average molecular weights in the range of about 15,000–80,000, as determined by gel permeation chromatography (GPC).

The polyester resin may be a high hydroxyl polyester or a blend of a first high hydroxyl polyester and a second polyester provided that the polyester resin as a whole has a hydroxyl content of at least 45 meq/kg, preferably greater than 50 meq/kg, more preferably greater than 70 meq/kg and most preferably at least 90 meq/kg. The high hydroxyl polyester component of the polyester resin blend preferably has a hydroxyl level of at least 70 meq/kg, more preferably at least 90 meq/kg, and most preferably at least 120 meq/kg, and preferably has a number average molecular weight of less than 25,000, more preferably less than 20,000, and most preferably less than 18,000. Molecular weights are preferably determined by gel permeation chromatography using polystyrene standards.

If a second polyester is used in combination with the first polyester, then it is preferred that the second polyester has a number average molecular weight of at least 23,000, and will typically have hydroxyl levels of less than 40 meq/kg and more typically less than 30 meq/kg.

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

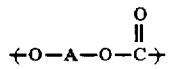

wherein A is a bivalent aromatic radical derived from the dihydric phenol used in the preparation of the polymer. Mononuclear or polynuclear aromatic compounds which comprise two hydroxy radicals which are each directly bonded to a carbon atom of an aromatic nucleus may be used as dihydric phenols in the preparation of the aromatic polycarbonates.

Examples of suitable dihydric phenols are: 2,2-bis-(4-hydroxyphenyl)propane; 2,2-bis(3,5-dimethyl-4-hydroxyphenyl)propane; 2,2-bis(3,5-dibromo-4-hydroxyphenyl)propane; 2,2-bis(3,5-dichloro-4-hydroxyphenyl)propane; hydroguinone; resorcinol; 2,2-bis-(4-hydroxyphenyl)pentane; 2,4'-(dihydroxy diphenyl) methane; bis(2-hydroxyphenyl)methane; bis-(4-hydroxyphenyl)methane; bis-(4-hydroxy-5-nitrophenyl) methane; 1,1-bis-(4-hydroxyphenyl)ethane; 3,3-bis(4-hydroxyphenyl)pentane; 2,6-dihydroxy naphthalene; bis-(4-hydroxydiphenyl)sulfone; bis-(3,5-diethyl-4-hydroxyphenyl)sulfone; 2,4'-dihydroxyphenyl sulfone, 5'-chloro-2,4'-dihydroxydiphenylsulfone; bis-(4-hydroxyphenyl)diphenyl sulfone; 4,4'-dihydroxydiphenyl ether; 4,4'-dihydroxy-3,3-dichlorodiphenyl ether;4,4'-dihydroxy-2,5-dihydroxy diphenyl ether.

Other dihydric phenols which are also suitable are described in U.S. Pat. Nos. 2,999,835, 3,028,365, 3,334,154, and 4,131,575.

The aromatic polycarbonates can be prepared according to methods known per se: for example, by reacting a dihydric phenol with a carbonate precursor, for example, phosgene. For this purpose, reference may be made to the just-mentioned United States Patent Specifications and to U.S. Pat. Nos. 4,098,750 and 4,123,436. They may also be prepared by a transesterification as described in U.S. Pat. No. 3,153,008.

The known branched polycarbonates are described for example, in U.S. Pat. No. 4,001,184 are also suitable.

Suitable aromatic polycarbonates are also the so-called polyester carbonates which are obtained by carrying out the polymerisation reaction in the presence of an ester precursor, for example, a difunctional ester-forming derivative thereof. These polyester carbonates have ester compounds and carbonate compounds in the polymeric chain. Polyester carbonates are described, for example, in U.S. Pat. No. 3,169,121.

In the polymer mixtures according to the invention it is also possible to use as an aromatic polycarbonate a mixture of various polycarbonates as mentioned hereinbefore.

A common method of preparing the aromatic polycarbonates is by the interfacial polymerization technique; see for example the details provided in the U.S. Pat. Nos. 3,028, 365; 3,334,154, 3,275,601; 3,915,926; 3,030,331; 3,169, 121; 3,027,814; and 4,188,314, all of which are incorporated herein by reference thereto.

In general, the method of interfacial polymerization comprises the reaction of a dihydric phenol with a carbonyl halide (the carbonate precursor). Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but not are limited to tertiary amines such as triethylamine, quaternary phosphonium compounds, quaternary ammonium compounds, and the like. The preferred process for preparing polycarbonate resins used as components of the blends the invention comprises a phosgenation reaction. The temperature at which the phosgenation reaction proceeds may vary from below about 0° C. to above about 100° C.

The carbonate precursor can be either a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, hydroguinone, and the like, or bishaloformates of glycols such as bishaloformates of ethylene glycol, and the like. While all of the above carbonate precursors are useful, carbonyl chloride, also known as phosgene, is preferred.

The number average molecular weight of the polycarbonate material preferably should be at least about 15,000 (as determined by gel permeation chromatography relative to polystyrene). It is most often in the range of about 40,000–80,000. However, compositions in which polycarbonate has a higher molecular weight often have favorable ductility at the expense of decreased flow. The exact molecular weight utilized will depend, in part, on the end-use requirements of the desired application and the degree of molding difficulty encountered in forming the part.

Also included within the blends of the present invention is the presence of randomly branched polycarbonates, randomly branched PEC, and/or randomly branched polyarylates. These randomly branched materials are sometimes useful for alteringthe rheological characteristics of the blends containing the linear polymers for fabrication techniques such as pressure forming or blow molding and can be used as partial or full replacements for the linear materials. The randomly branched polymers are prepared by co-reacting a polyfunctional organic compound with the afore-described dihydric phenols, carbonate and/or ester precursors. The polyfunctional organic compounds useful in making the branched polycarbonates are set forth in U.S. Pat. Nos. 3,544,514, 3,635,895 and 4,001,184 which are incorporated herein by reference. The polyfunctional compounds are generally aromatic and contain at least three functional groups which are carboxyl, carboxylic anhydrides, phenols, haloformyls, or mixtures thereof. Some nonlimiting examples of these polyfunctional aromatic compounds include 1,1,1-tri(4-hydroxyphenyl)ethane, 1,3,5-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride, and the like. The preferred polyfunctional aromatic compounds are 1,1,1-tri(4-hydroxyphenyl)ethane, trimellitic anhydride or trimellitic acid or their haloformyl derivatives.

Also included within the scope of the present invention is the use of the linear polycarbonates such as the linear polycarbonate oligomers described in U.S. Pat. No. 5,153,276, incorporated herein by reference. The linear polycarbonates may be prepared by a variety of well-known processes, including: interfacial polymerization as set forth in F. Millich and C. Carraher, Jr., eds, Interfacial synthesis, Vol. II, Marcel Dekker, Inc., New York (1977), Chpt. 13; and melt transesterification as described in H. Schnell, Chemistry and Physics of Polycarbonates, Wiley-Interscience, New York (1964), (section III, 3, A, 4).

In other embodiments of the present invention, the compositions can further comprise impact modifiers. Particularly useful impact modifiers generally comprise rubbery impact modifiers. These are well known to those skilled in the art, and any of them normally employed with polyester resins may be employed herein.

The preferred impact modifiers generally comprise an acrylic or methacrylic grafted polymer of a conjugated diene or an acrylate elastomer, alone, or copolymerized with a vinyl aromatic compound. Particularly useful are the core-shell polymers of the type available from Rohm & Haas, for example, those sold under the trade designation Acryloid®. In general these impact modifiers contain units derived from butadiene or isoprene, alone or in combination with a vinyl aromatic compound, or butyl acrylate, alone or in combination with a vinyl aromatic compound. The aforementioned impact modifiers are believed to be disclosed in Fromuth et al., U.S. Pat. No. 4,180,494; Owens, U.S. Pat. No. 3,808,180; Farnham et al., U.S. Pat. No. 4,096,202; and Cohen et al., U.S. Pat. No. 4,260,693. Most preferably, the impact modifier will comprise a two stage polymer having either a butadiene or butyl acrylate based rubbery core and a second stage polymerized from methylmethacrylate alone, or in combination with styrene. Also present in the first stage are crosslinking and/or graftlinking monomers. Examples of the crosslinking monomers include 1,3-butylene diacrylate, divinyl benzene and butylene dimethacrylate. Examples of graftlinking monomers are allyl acrylate, allyl methacrylate and diallyl maleate.

Additional preferred impact modifiers are of the type disclosed in U.S. Pat. No. 4,292,233. These impact modifiers comprise, generally, a relatively high content of a butadiene polymer grafted base having grafted thereon acrylonitrile and styrene.

Other suitable impact modifiers include, but are not limited to ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc. All of these are well known to those skilled in the art and are available commercially.

The composition may contain additives, such as fillers, fiberglass, flame retardants, mold release agents, paint adhesion promoters, colorants, dyes, lubricants and/or stabilizers.

In the compositions, the quenchers (melt stabilizers) are used at a level of 0.01–10 weight percent and preferably at a level of from 0.05–2 weight percent. The quenchers include an effective amount of an acidic phosphate salt; an acid, alkyl, aryl or mixed phosphite having at least one hydrogen or alkyl group; a Group IB or IIB metal phosphate salt; a phosphorous oxo acid, a metal acid pyrophosphate or a mixture thereof. The suitability of a particular compound for use as a quencher and the determination of how much is to be used as a quencher may be readily determined by preparing a mixture of the polyester component, the polycarbonate with and without the particular compound and determining the effect on melt viscosity or color stability or the formation of interpolymer. The acidic phosphate salts include sodium dihydrogen phosphate, mono zinc phosphate, potassium dihydrogen phosphate, calcium dihydrogen phosphate and the like. The phosphites may be of the formula:

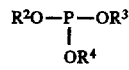

where $R^2$, $R^3$ and $R^4$ are independently selected from the group consisting of hydrogen, alkyl and aryl with the proviso that at least one of $R^2$, $R^3$ and $R^4$ is hydrogen or alkyl.

The phosphate salts of a Group IB or IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $KNaH_2P_2O_7$ and $Na_2H_2P_2O_7$. The particle size of the polyacid pyrophosphate should be less than 50 microns, preferably less than 20 microns and most preferably less than 10 microns.

EXAMPLES

Sample preparation

Blends were prepared by first dry-blending the raw materials using a Gunther Papenmeier model 1281 high-speed mixer and then melt-mixing using a Werner and Pfleiderer 30 mm twin screw extruder. The temperature settings from the throat to the die were 50°, 200°, 220°, 240°, 240° C. Screw speed was 300 rpm, and feed rate was adjusted to maintain a torque of approximately 80 percent.

Specimens for impact testing were prepared by injection molding using an 85 ton Demag molding machine. Three different molding conditions were used to produce examples. "255C/3 min" indicates molding using a temperature profile from the throat to the nozzle of 50°, 235°, 245°, 255°, 250° C. and a residence time of 3 minutes, while "285C/6 min" and "285C/11 min" indicate a temperature profile from the throat to the nozzle of 50°, 265°, 275°, 285°, 280° C. and a residence time of 6 minutes and 11 minutes, respectively. Mold temperature was 60° C. for all samples. Pellets were dried at 120° C. for a minimum of 2 hours. Test specimens were mm wide, mm thick, and cm long. The notch was 2.0 mm deep.

Property determination

Melt volume rate (MVR) was determined according to ISO procedure ISO1133 using a Zwick MI tester type 4105. The value of MVR was expressed as ml of material eluted through a capillary in 10 minutes. Samples (Granulate) were dried for two hours at 120° C. before measuring. The weight used for the measurement was 2.16 kg, unless specified otherwise, the melting time was 4 minutes, and the temperature was 250° C. The capillary was 8 mm long with an inside diameter of 2.1 mm.

Ductile-brittle transition temperature (D/B temperature) was determined by measuring notched-Izod impact at different temperatures and determining at which temperature the fracture behavior goes from ductile to brittle. At temperatures below the D/B temperature, fracture behaviour is brittle and crack propagation occurs with relatively little energy absorption, while at temperatures above the D/B temperature, the material is ductile and crack propagation occurs with relatively large energy absorption. Notched-Izod impact testing was done according to ISO procedure ISO180 using a 2.75 Joule hammer. Five specimens were tested at a given temperature. The specimens were 10 millimeters wide, 4 millimeters thick and 8 centimeters long.

Polybutylene terephthalate (PBT) characterization

Gel permeation chromatography (GPC) was done on PBT samples dissolved in a mixture of hexafluoroisopropanol (HFIP) and chloroform (1/19 v/v HFIP/chloroform) using a Waters model 150° C. GPC equipped with 500 and $10^4$ Å Hewlet Packard columns packed with crosslinked polystyrene, and a refractive index detector. The instrument was operated at 40° C. using a solvent system composed of a mixture chloroform and m-cresol (1/19 v/v m-cresol/chloroform, and a flow rate of 1.0 ml/min. All molecular weights were reported as being relative to polystyrene.

PBT end-group composition was determined using fourier transform infrared spectroscopy. The COOH absorption at 3290 $cm^{-1}$ and OH absorption at 3550 $cm^{-1}$ of films prepared from the melt were used for the measurement. The ester overtone at 3410 $cm^{-1}$ was used to correct for differences in film thickness. Calibration curves were produced using PBTs of known end-group composition.

Materials

The poly(butylene terephthalates) (PBTs) used are described in Table I, while the bisphenol-A polycarbonate (PC) polymers are described in Table II. Table III describes all of the additives used. Two impact modifiers were used. The impact modifier referred to in the examples as "MBS" is a methylmethacrylate-butadiene-styrene core-shell graft copolymer sold by Rohm and Haas under the tradename "Paraloid EXL 2600." The impact modifier referred to in the examples as "ABS" is an acrylonitrile-butadiene-styrene graft copolymer containing 65% rubber. This material is sold by Ube Cycon under the tradename "SG24."

TABLE I

PBTs Used In Examples

| PBT | Mn† | Mw† | (COOH)* | (OH)* |
|---|---|---|---|---|
| A | 34,100 | 108,500 | 48 | 22 |
| B | 23,700 | 81,700 | 63 | 35 |
| C | 24,000 | 78,600 | 24 | 77 |
| D | 19,800 | 61,100 | 28 | 90 |
| E | 17,000 | 46,000 | 29 | 122 |
| F | 34,000 | 107,600 | 19 | 51 |

*meq/kg
† Determined by Gel Permeation Chromatography using polystyrene standards.

TABLE II

PCs Used In Examples

| PC | Mw† | I.V. (g/ml)* |
|---|---|---|
| I | 23,300 | 49.0 |
| II | 26,200 | 53.0 |
| III | 30,500 | 58.5 |

† Determined by Gel Permeation Chromatography using methylene chloride as the carrier solvent. Values are expressed relative to PC.
*Intrinsic viscosity determined in methylene chloride.

TABLE III

Description Of Additives Used

| ID | Composition |
|---|---|
| a | pentaerythritol tetrastearate |
| b | octadecyl-3-(3,5-di-tert-butyl-4-hydroxylphenyl-propionate |
| c | Pentaerythritol-tetrakis-(3-laurylthiopropionate) |
| d | phosphorous acid (45% aqueous solution) |
| e | poly(ethylene glycol) Mw = 3350 |
| f | 3,4-epoxycyclohexylmethyl-3,4-epoxylcyclohexylcarboxylate |
| g | 2-(2-hydroxy-5-tert-octylphenyl)benzotriazole |
| h | titanium dioxide (rutile) |
| i | carbon black |
| j | silicon oil poly(dimethylsiloxane) |

Each of the tables to follow represent a single experiment. Thus, for each example in a given table, the extrusion conditions, molding conditions, testing conditions, etc. were the identical. The materials designated "R1", "R2" etc. are reference materials. OH, hydroxyl, content of PBT resin(s) used in the examples is given in milli-eguivalents/kg of PBT resin.

TABLE IV

| Example # | R1 | 1 | 2 | 3 | 4 | 5 |
|---|---|---|---|---|---|---|
| PBT | B | C | A/E | A/D | A/E* | A/D* |
| RATIO | — | — | 50/50 | 30/70 | 50/50 | 30/70 |
| MVR | 12.8 | 12.31 | 13.55 | 12.08 | 15.41 | 16.18 |
| D/B STD | −33 | −33 | −33 | −35 | −37 | −33 |
| D/B 6 MIN | −25 | −28 | −28 | −28 | −28 | −28 |
| D/B 11 MIN | −16 | −28 | −27 | −28 | −28 | −28 |
| OH meq/kg | 35 | 77 | 72 | 92 | 72 | 92 |

PBT = 38.67%, PC "I" = 49.2%, MBS = 11%, Additive "e" = 0.5%, Additive "f" = 0.05%, Additive "b" = 0.3%, Additive "c" = 0.2%, Additive "d" = 0.08%, *Additive "e" was removed from the formulation.

TABLE V

| Example # | R2 | 6 | 7 |
|---|---|---|---|
| PBT | B | A/E | A/D |
| RATIO | — | 50/50 | 25/75 |
| MVR | 11.86 | 10.72 | 11.26 |
| D/B STD | 0 | −5 | −2 |
| D/B 6 MIN | 13 | 5 | 3 |
| D/B 11 MIN | 23 | 13 | 5 |
| OH meq/kg | 35 | 72 | 73 |

PBT = 53.29%, PC "II" = 35.53%, MBS = 10%, Additive "a" = 0.3%, Additive "f" = 0.05%, Additive "b" = 0.3%, Additive "c" = 0.2%, Additive "d" = 0.08%, Additive "g" = 0.25%

TABLE VI

| Example # | R3 | 8 | 9 | 10 | 11 |
|---|---|---|---|---|---|
| PBT | B* | C | A/E | A/E | A/E |
| RATIO | — | — | 55/45 | 50/50 | 45/55 |
| MVR | 12.4 | 11.3 | 10.6 | 10.9 | 12.9 |
| D/B STD | −23 | −30 | −32 | −33 | −30 |
| D/B 11 MIN. | −7 | −13 | — | −12 | — |
| OH meq/kg | 35 | 77 | 67 | 72 | 77 |

PBT = 41.84%, PC "1" = 45.32%, MBS = 11%, Additive "f" = 0.05%, Additive "b" = 0.3%, Additive "c" = 0.2%, Additive "d" = 0.008%, Additive "a" = 0.3%, Additive "i" = 0.01%, Additive "h" = 0.5%.
*contained 0.5% of additive "e".

TABLE VII

| Exa # | R4 | 12 | 13 | 14 | 15 | 16 | 17 | 18 |
|---|---|---|---|---|---|---|---|---|
| PBT | B | A/E | A/E | A/E | A/D | A/D | A/D | A/E* |
| Ratio | — | 55/45 | 45/55 | 35/65 | 40/60 | 20/80 | 10/90 | 45/55 |
| MVR | 11.82 | 11.09 | 12.88 | 15.44 | 10.38 | 13.11 | 14.61 | 12.73 |
| D/B std | −23 | −25 | −25 | −27 | −32 | −32 | −25 | −32 |
| OH meq/kg | 35 | 67 | 77 | 87 | 63 | 76 | 83 | 77 |

PBT = 38.67%, PC "1" = 49.2%, MBS = 11%, Additive "e" = 0.5%, Additive "f" = 0.05%, Additive "b" = 0.3%, Additive "c" = 0.2%, Additive "d" = 0.08%. *Additive "e" was removed from the formulation.

TABLE VIII

| Example # | R5 | 19 | 20 | 21 |
|---|---|---|---|---|
| PBT | B | A/E | A/E | A/D |
| RATIO | — | 55/45 | 45/55 | 20/80 |
| MVR | 10.61 | 9.50 | 11.14 | 11.44 |
| D/B STD | −3 | −12 | −4 | −6 |
| OH meq/kg | 35 | 67 | 77 | 76 |

PBT = 53.29%, PC "111" = 35.53%, MBS = 10%, Additive "a" = 0.3%, Additive "f" = 0.05%, Additive "b" = 0.03%, Additive "c" = 0.2%, Additive "d" = 0.08%, Additive "g" = 0.25%.

TABLE IX

| Example # | R6 | 22 | 23 |
|---|---|---|---|
| PBT | B* | C | A/E |
| RATIO | — | — | 50/50 |
| MVR | 12.0 | 11.5 | 10.6 |
| D/B STD | −27 | −32 | −32 |
| OH meq/kg | 35 | 77 | 72 |

PBT = 42.1%, PC "1" = 45.61%, MBS = 11%, Additive "b" = 0.3%, Additive "c" = 0.1%, Additive "d" = 0.08%, Additive "a" = 0.3%, Additive "i" = 0.01%, Additive "h" = 0.50%.
*contained 0.5% of additive "e".

TABLE X

| Example # | R7 | R8 | 24 |
|---|---|---|---|
| PBT | B* | B | C |
| MVR | 13.85 | 12.26 | 12.52 |
| D/B STD | −35 | −35 | −35 |
| D/B 6 MIN | −22 | −22 | −28 |
| D/B 11 MIN | −20 | −20 | −25 |
| OH meq/kg | 35 | 35 | 77 |

PBT = 38.67%, PC "1" = 49.2%, MBS = 11%, Additive "f" = 0.05%, Additive "b" = 0.3%, Additive "c" = 0.2%, Additive "d" = 0.08%.
*contained 0.5% of additive "e".

TABLE XI

| Example # | R9 | 25 |
|---|---|---|
| PBT | A | F |
| MVR* | 13.5 | 11.4 |
| D/B std | −38 | −48 |
| D/B 11 min | −3 | −25 |
| OH meq/kg | 22 | 51 |

PBT = 58.1%, PC "11" = 23.87%, ABS = 16.5%, Additive "e" = 0.5%, Additive "f" = 0.03%, Additive "b" = 0.5%, Additive "j" = 0.7%, Additive "d" = 0.08%, Additive "c" = 0.22%
*MVR was done using a temperature of 250° C. and weight of 5.0 kg.

TABLE XII

| Example # | R10 | 26 |
|---|---|---|
| PBT | A/B | F/C |
| Ratio | 50/50 | 50/50 |
| MVR* | 18.5 | 15.8 |
| D/B std | −33 | −35 |
| D/B 11 min | −5 | −13 |
| OH meq/kg | 29 | 64 |

PBT = 58%, PC "111" = 26.09%, ABS = 15%, Additive "b" = 0.5%, Additive "c" = 0.30%, Additive "f" = 0.03%, Additive "d" = 0.08%
*MVR was done using a temperature of 250° C. and weight of 5.0 kg.

We claim:

1. A thermoplastic composition comprising:
   (a) a poly(butylene terephthalate) resin having a number average molecular weight of less than 25,000 and a hydroxyl content of greater than 45 meq/kg,
   (b) an aromatic polycarbonate resin, and
   (c) a quencher selected from the group consisting of phosphites, acidic phosphate salts, polyacid pyrophosphates and salts thereof, phosphates of Group IB and Group IIB metals, and phosphorous oxo-acids.

2. The thermoplastic composition of claim 1, wherein said composition further comprises an impact strength enhancing amount of a graft copolymer comprising a rubbery substrate and a rigid polymeric superstrate.

3. The composition of claim 1 wherein the poly(alkylenephthalate) is a poly(alkylene terephthalate), said poly(alkylene terephthalate) resin being present at a level of from 20 to 70 percent by weight based on the total weight of the composition, said aromatic polycarbonate resin being present at a level of from 20 to 65 percent by weight based on the total weight of the composition, said graft copolymer being present at a level of from 5 to 20 percent by weight based on the total weight of the composition.

4. The composition of claim 3 wherein said graft copolymer is selected from methylmethacrylate-butadiene-styrene graft copolymers and acrylonitrile-butadiene-styrene graft copolymer.

5. The composition of claim 1 wherein said hydroxyl content is greater than 50 meq/kg, said polyalkylenephthalate is a poly(alkylene terephthalate) resin having a number average molecular weight of less than 20,000.

6. The composition of claim 1 wherein said hydroxyl content is greater than 70 meq/kg.

7. The composition of claim 1 wherein said polyalkylenephthalate resin is a blend of (i) a first polyalkylene terephthalate having a hydroxyl level of at least 70 meq/kg, and (ii) a second polyalkylene terephthalate having a number average molecular weight greater than the number average molecular weight of the first polyalkylene terephthalate.

8. The composition of claim 7 wherein said first polyalkylene terephthalate has a number average molecular weight of less than 20,000.

9. The composition of claim 8 wherein said second polyalkylene terephthalate has a number average molecular weight of greater than 23,000.

10. The composition of claim 9 wherein said second polyalkylene terephthalate has a hydroxyl level of less than 40 meq/kg.

11. A thermoplastic composition comprising
(a) a polybutylene terephthalate resin having a number average molecular weight of less than 25,000 and a hydroxyl level of at least 70 meq/kg, said polybutylene terephthalate resin being present in said composition at a level of from 30 to 60 percent by weight based on the total weight of the composition,
(b) an aromatic polycarbonate resin present at a level of from 30 to 60 percent by weight based on the total weight of the composition, and
(c) a quencher selected from the group consisting of phosphites, acidic phosphate salts, polyacid pyrophosphates and salts thereof, phosphates of Group IB and Group IIB metals, and phosphorous oxo-acids,
(d) a diene rubber graft copolymer present at a level of from 5 to 20 percent by weight based on the total weight of the composition.

12. The composition of claim 11 consisting essentially of said polybutylene terephthalate resin, said aromatic polycarbonate resin, said quencher and said diene rubber graft copolymer.

13. The composition of claim 11 wherein said polybutylene terephthalate resin has a hydroxyl level of at least 70 meq/kg.

14. The composition of claim 11 wherein said polybutylene terephthalate resin is present at a level of between 35 and 55 percent by weight based on the total weight of the composition, said aromatic polycarbonate resin being present at a level of between 35 and 55 percent by weight based on the total weight of the composition, said graft copolymer being present at a level of from 10 to 15 percent by weight based on the total weight of the composition.

* * * * *